US011775535B2

(12) United States Patent
Frumkin et al.

(10) Patent No.: US 11,775,535 B2
(45) Date of Patent: Oct. 3, 2023

(54) PRESENTING SEARCH RESULT INFORMATION

(71) Applicant: Google LLC, Mountain View, CA (US)

(72) Inventors: Michael Frumkin, Santa Cruz, CA (US); Benedict A. Gomes, Mountain View, CA (US); Christopher Rohrs, Mountain View, CA (US); Shashi Seth, Foster City, CA (US); Avni Stocky, Mountain View, CA (US); Bay-Wei Chang, Foster City, CA (US); Xiangtian Dai, Sunnyvale, CA (US); Kushal Dave, New York, NY (US); Paul Fontes, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 832 days.

(21) Appl. No.: 16/710,895

(22) Filed: Dec. 11, 2019

(65) Prior Publication Data
US 2020/0117673 A1 Apr. 16, 2020

Related U.S. Application Data

(63) Continuation of application No. 15/816,846, filed on Nov. 17, 2017, now Pat. No. 10,521,438, which is a
(Continued)

(51) Int. Cl.
*G06F 16/20* (2019.01)
*G06F 16/2457* (2019.01)
(Continued)

(52) U.S. Cl.
CPC ...... *G06F 16/24578* (2019.01); *G06F 3/0484* (2013.01); *G06F 16/248* (2019.01); *G06F 16/951* (2019.01)

(58) Field of Classification Search
CPC ............. G06F 16/24578; G06F 16/951; G06F 16/248; G06F 3/0484
See application file for complete search history.

(56) References Cited

U.S. PATENT DOCUMENTS

| 5,515,496 | A | 5/1996 | Kaehler et al. |
| 5,760,773 | A | 6/1998 | Berman et al. |
(Continued)

FOREIGN PATENT DOCUMENTS

| CN | 1755678 | 4/2006 |
| EP | 1030247 | 8/2000 |
| WO | 0116807 | 3/2001 |

OTHER PUBLICATIONS

Dumais, Susan, Edward Cutrell, JJ Cadiz, Gavin Jancke, Raman Sarin, and Daniel C. Robbins. "Stuff I've Seen: A System for Personal Information Retrieval and Re-Use." Microsoft Research; Redmond, WA; 2003 (8 pages). Jan. 1, 2003.
(Continued)

*Primary Examiner* — Tarek Chbouki
(74) *Attorney, Agent, or Firm* — Gray Ice Higdon

(57) ABSTRACT

A method of presenting computer-generated search result information can include receiving a search request from a client computer; identifying a plurality of search results responsive to the search request; ranking the plurality of search results using content in one or more web notebooks; and providing the ranked plurality of search results for presentation in the client computer. Using the content can include determining whether at least one of a title, a heading, clipped content, metadata or a user-annotation in at least one web notebook relates to the search request and, if so, increasing a ranking of at least one search result referenced by the at least one web notebook.

14 Claims, 7 Drawing Sheets

Related U.S. Application Data continuation of application No. 15/016,444, filed on Feb. 5, 2016, now Pat. No. 9,852,191, which is a continuation of application No. 11/746,951, filed on May 10, 2007, now Pat. No. 9,256,676.

(60) Provisional application No. 60/746,954, filed on May 10, 2006.

(51) Int. Cl.
  *G06F 16/248* (2019.01)
  *G06F 16/951* (2019.01)
  *G06F 3/0484* (2022.01)

(56) References Cited

U.S. PATENT DOCUMENTS

| | | |
|---|---|---|
| 6,119,135 A | 9/2000 | Helfman |
| 6,310,630 B1 | 10/2001 | Kulkarni et al. |
| 6,327,590 B1 | 12/2001 | Chidlovskii et al. |
| 6,366,923 B1 | 4/2002 | Lenk et al. |
| 6,460,038 B1 | 10/2002 | Khan et al. |
| 6,522,342 B1 | 2/2003 | Gagnon et al. |
| 6,546,388 B1 | 4/2003 | Edlund et al. |
| 6,631,496 B1 | 10/2003 | Li et al. |
| 6,694,357 B1 | 2/2004 | Volnak |
| 6,718,365 B1 | 4/2004 | Dutta |
| 6,745,178 B1 | 6/2004 | Emens et al. |
| 6,763,388 B1 | 7/2004 | Tsimelzon |
| 6,763,399 B2 | 7/2004 | Margalit et al. |
| 6,976,210 B1 | 12/2005 | Silva et al. |
| 7,058,902 B2 | 6/2006 | Iwema et al. |
| 7,206,839 B2 | 4/2007 | Ingram et al. |
| 7,360,175 B2 | 4/2008 | Gardner et al. |
| 7,478,336 B2 | 1/2009 | Chen et al. |
| 7,503,012 B2 | 3/2009 | Chen et al. |
| 7,702,811 B2 | 4/2010 | Gopalan et al. |
| 9,256,676 B2 | 2/2016 | Frumkin et al. |
| 9,852,191 B2 | 12/2017 | Frumkin et al. |
| 10,521,438 B2 | 12/2019 | Frumkin et al. |
| 2001/0044834 A1 | 11/2001 | Bradshaw et al. |
| 2002/0025085 A1 | 2/2002 | Gustafson et al. |
| 2002/0065802 A1 | 5/2002 | Uchiyama |
| 2003/0112270 A1 | 6/2003 | Newell et al. |
| 2004/0205493 A1 | 10/2004 | Simpson et al. |
| 2004/0225716 A1 | 11/2004 | Shamir et al. |
| 2005/0033657 A1 | 2/2005 | Herrington et al. |
| 2005/0091609 A1 | 4/2005 | Matthews et al. |
| 2005/0102630 A1 | 5/2005 | Chen et al. |
| 2005/0154994 A1 | 7/2005 | Chen et al. |
| 2005/0182773 A1 | 8/2005 | Feinsmith |
| 2005/0216457 A1 | 9/2005 | Walther et al. |
| 2005/0234904 A1 | 10/2005 | Brill et al. |
| 2005/0246540 A1 | 11/2005 | Brown |
| 2006/0026147 A1 | 2/2006 | Cone et al. |
| 2006/0053169 A1* | 3/2006 | Straub .................. G06F 16/951 |
| 2006/0074871 A1 | 4/2006 | Meyerzon et al. |
| 2006/0074980 A1* | 4/2006 | Sarkar .................. G06F 16/958 |
| 2006/0161859 A1 | 7/2006 | Holecek et al. |
| 2006/0173830 A1 | 8/2006 | Smyth et al. |
| 2006/0200390 A1 | 9/2006 | Ananian |
| 2006/0274086 A1 | 12/2006 | Forstall et al. |
| 2006/0277460 A1 | 12/2006 | Forstall et al. |
| 2007/0011146 A1 | 1/2007 | Holbrook |
| 2007/0011150 A1 | 1/2007 | Frank |
| 2007/0038616 A1 | 2/2007 | Guha |
| 2007/0067304 A1 | 3/2007 | Ives |
| 2007/0106952 A1 | 5/2007 | Matas et al. |
| 2007/0185865 A1 | 8/2007 | Budzik et al. |
| 2007/0208800 A1 | 9/2007 | Frohlich et al. |
| 2008/0046845 A1 | 2/2008 | Chandra |
| 2008/0086471 A1 | 4/2008 | Ritter et al. |
| 2008/0168388 A1 | 7/2008 | Decker |
| 2008/0195495 A1 | 8/2008 | Rubin et al. |
| 2008/0201650 A1 | 8/2008 | Lemay et al. |
| 2008/0307301 A1 | 12/2008 | Decker et al. |
| 2008/0307308 A1 | 12/2008 | Sullivan et al. |
| 2009/0044138 A1 | 2/2009 | Rudolph et al. |
| 2009/0119258 A1 | 5/2009 | Petty |
| 2011/0082849 A1 | 4/2011 | Rakowski et al. |
| 2013/0212463 A1 | 8/2013 | Pachikov et al. |

OTHER PUBLICATIONS

Zotero—The Next-Generation Research Tool [online], [retrieved Jul. 16, 2007] Retrieved from Internet; URL: http://www.zotero.org, 5 pages. Jul. 16, 2007.

Zoho Notebook Press Release [online], [retrieved Aug. 31, 2007] Retrieved from Internet http://mashable.com/2007/05/21/zoho-notebook; 1 page. Aug. 31, 2007.

CN Office Action in Application No. 200780026182.8; 10 pages; dated Nov. 22, 2010.

CN Office Action in Application No. 201010567887.4, dated Mar. 19, 2013, 7 pages (with English translation) dated Mar. 19, 2013.

CN Office Action in Application No. 201010567887.4, dated Apr. 26, 2012, 4 pages dated Apr. 26, 2012.

CN Office Action in Application No. 201010567887.4, dated Sep. 29, 2013, 10 pages (with English translation) dated Sep. 29, 2013.

European Examination Report, EP 07 783 616.1, dated Jan. 4, 2012, 4 pages dated Jan. 4, 2012.

European Patent Office Action, Application Serial No. EP 07 762 103.5, dated Mar. 18, 2009, 4 pages dated Mar. 18, 2009.

International Preliminary Report on Patentability & Written Opinion, PCT/US2007/068695, dated Nov. 20, 2008, 8 pages dated Nov. 20, 2008.

International Preliminary Report on Patentability & Written Opinion, PCT/US2007/068662, dated Nov. 20, 2008, 7 pages dated Nov. 20, 2008.

International Search Report & Written Opinion, PCT.US2007.068662, dated Nov. 6, 2007, 12 pages dated Nov. 6, 2007.

International Search Report & Written Opinion, PCT.US2007.068709, dated Nov. 8, 2007, 14 pages dated Nov. 8, 2007.

International Preliminary Report on Patentability & Written Opinion, PCT.US2007.068709, dated Nov. 20, 2008, 8 pages dated Nov. 20, 2008.

Manber, U. "Creating a Personal Web Notebook," Proceedings of the Usenix Symposium on Internet Technologies and Systems, Dec. 11, 1997, pp. 183-191, Monterey, CA, USA. 9 pages. Dec. 11, 1997.

Reimer, Y. J. et al., "Implementation Challenges Associated with Developing a Web-based E-notebook," Journal of Digital Information [Online] vol. 4, No. 3, 2004, ISSN: 1368-7506, 14 pages. Oct. 24, 2007.

Sugiura, A. et al. "Internet Scrapbook: Automating Web Browsing Tasks by Demonstration," Proceedings of the 11th Annual Symposium on User Interface Software and Technology, Nov. 1-4, 1998, pp. 9-18, San Francisco, CA, USA, ISBN: 1-58113-034-1 Nov. 1, 1998.

Engst, A.C., "Internet Explorer 5.0 Redisplays the Web," Internet Article [Online] Mar. 27, 2000, Retrieved from the Internet: URL: http://db.tidbits.com/article/5872> [retrieved on Oct. 25, 2007] Paragraph titled "Keeping a Scrapbook." 5 pages. Mar. 27, 2000.

"Bluebell-Internet Scrapbook-1U5" Internet Article [Online] Feb. 26, 2002, Retrieved from the Internet: URL: http://www.download32.com/bluebell-internet-scrapbook--i22878.html [retrieved on Oct. 25, 2007], 2 pages Feb. 26, 2002.

Amazon Screenshot, So You'd Like to . . . Create a Guide, Retrieved from Internet, [retrieved on Mar. 22, 2006] 2 pages Mar. 22, 2006.

Amazon.com, Inc., Amazon Listmania, Copyright 1995-2005, [online], [retrieved on Mar. 22, 2006] Retrieved from Amazon.com using Internet URL: http://www.amazon.com/gp/help/ customer/display.html?nodeId=14279651. 8 pages Mar. 22, 2006.

Backpack Publish Firefox Extension, Slow Burn Productions [online], [retrieved Jul. 16, 2007] Retrieved from Internet, URL: http://slowburnproductions.wordpress.com/2007/04/25backpack-publish-firefox-extension, 4 pages. Apr. 25, 2007.

(56) References Cited

OTHER PUBLICATIONS

Citebite-Link directly to specific quotes in web pages [online], [retrieved Jul. 16, 2007] Retrieved from Internet, URL: http://www.citebrite com, 2 pages Jul. 16, 2007.
Clipmarks—Learn More [online], [retrieved Jul. 16, 2007] Retrieved from Internet, URL: http://www.clipmarks.com/learn-more, 4 pages. Jul. 16, 2007.
Cogitum, L.C., Cogitum Co-Citer, Copyright 2000-2006, [online], [retrieved on Mar. 22, 2006] Retrieved from Cogitum, L.C. using Internet; URL: http://www.cogitum.com/co-tracker-text/more.shtml. 2 pages Mar. 22, 2006.
Dabble Video Search Launchpad [online], [retrieved Jul. 16, 2007] Retrieved from Internet URL: http://www.http://dabble.com. 2 pages Jul. 16, 2007.
Diigo—Social Annotation: Seamless Integration of Social Bookmarking, Web Highlighter, Sticky-Note & Clipping [online], [retrieved Jul. 16, 2007] Retrieved from Internet, URL: http://www.diigo.com, 3 pages Jul. 16, 2007.
ESnips—Make your life easier with eSnips Uploader [online], [retrieved Jul. 16, 2007] Retrieved from Internet, URL: http://www.esnips.com/tour/page8.jsp, 1 page. Jul. 16, 2007.
EverNote—A single place for all your notes! [online], [retrieved Jul. 16, 2007] Retrieved from Internet, URL: http://www.evernote.com/en, 2 pages Jul. 16, 2007.
EverNote Corporation, EverNote products, Copyright 2006, [online], [retrieved on Mar. 22, 2006] Retrieved from EverNote Corporation using Internet, URL: http://www.evernote.com/en/products/evernote/features.php, 7 pages. Mar. 22, 2006.
Fleck.com—Fleck the Web! [online], [retrieved Jul. 16, 2007] Retrieved from Internet, URL: http://fleck.com, 2 pages. Jul. 16, 2007.
Giles-Peters, Andrew, ScrapBook: A Firefox extension for gathering information from the web, Dec. 2005, [online], [retrieved on Mar. 22, 2006] Retrieved from Mozilla using Internet, URL: http://www.mozilla.com/en-US/firefox/central, 56 pages. Dec. 1, 2005.
Google Shopping List [online], [retrieved on Jun. 18, 2007] Retrieved from Internet, URL: http://froogle.com/shoppinglist, 1 page. Jun. 18, 2007.
I-Lighter :: the yellow highlighter for the web [online], [retrieved Jul. 16, 2007] Retrieved from Internet, URL: http://www.i-lighter com, 2 pages. Jul. 16, 2007.
Jeteye—How to Create Your First Jetpak Jeteye.com [online], [retrieved Jul. 16, 2007] Retrieved from Internet, URL: http://www.jeteye.com/jetpak/5e065b9d-db01-4b66-a523-0f6c4667b8cf, 2 pages. Jul. 16, 2007.
Kaboodle—Organize [online], [retrieved Jul. 13, 2007] Retrieved from Internet URL: http://www.kaboodle.com/ht/img/hom/promo2.gif, 1 page. Jul. 13, 2007.
Kaboodle—Shopping is more fun with friends [online], [retrieved Jul. 16, 2007] Retrieved from Internet URL: http://www.kaboodle.com, 4 pages. Jul. 16, 2007.
Kaboodle, Inc., Kaboodle, Copyright 2006, [online], [retrieved on Mar. 22, 2006] Retrieved from Kaboodle.com using Internet, URL: http://www.kaboodle.com/zd/help0/learnhow.html, 5 pages. Mar. 22, 2006.
Koonji—How to Use It [online], [retrieved on Aug. 31, 2007] Retrieved from Kaboodle.com using Internet, URL: http://www.koonji.com/learnMore.htm, 9 pages. Aug. 31, 2007.
Macropool GmbH, Content Saver, Copyright 2006, [online], [retrieved on Mar. 22, 2006] Retrieved from Macropool GmbH using Internet, URL: http://www.macropool.com/en/products/contentsaver/index.html, 2 pages Mar. 22, 2006.
Microsoft Corporation, How to change the placement of your notes in OneNote 2003, Last Review date Aug. 5, 2004, Copyright 2006, [online], retrieved on Mar. 22, 2006] Aug. 5, 2004.
Microsoft Corporation, Onfolio Add-in for Windows Live Toolbar, Copyright 2002-2006, [online], [retrieved on Mar. 22, 2006] Retrieved from Microsoft Corporation using internet URL: http://www.onfolio.com/product/toolbaraddin/, 2 pages. Mar. 22, 2006.
Net Snippets Ltd, Net Snippets Maximizing Online Research, Copyright 2001-2005, [online], [retrieved on Mar. 22, 2006] retrieved from Net Snippets Ltd using Internet URL: http://www.netsnippets.com/professional.htm, 4 pages. Mar. 22, 2006.
Notemark: Your Personal Save Engine, [online], [retrieved on Jul. 16, 2007] Retrieved from Notemark using Internet URL: http://www.notemark.com/how_it_works.php, 8 pages. Jul. 16, 2007.
Omni Group—OmniOutliner [online], [retrieved Jul. 16, 2007] Retrieved from Internet URL: http://www.omnigroup.com/applications/omnioutliner, 4 pages Jul. 16, 2007.
Plum Ventures, Inc., Plum, Copyright 2006, [online], [retrieved on Mar. 22, 2006] Retrieved from Plum Ventures, Inc. using Internet URL: http://www.plum.com/help.plum, 12 pages. Mar. 22, 2006.
Plum: Welcome to Plum [online], [retrieved Jul. 16, 2007] Retrieved from Internet URL: http://www.plum.com, 2 pages. Jul. 16, 2007.
PreFound—Download PFfinder [online], [retrieved Jul. 16, 2007] Retrieved from Internet URL: http://www.prefound.com/pffinder.php, 2 pages. Jul. 16, 2007.
SharedCopy [online], [retrieved Jul. 16, 2007] Retrieved from Internet URL: http://www.sharedcopy.com, 16 pages Jul. 16, 2007.
Stickis [online], [retrieved Jul. 16, 2007] Retrieved from Internet URL: http://www.stickis.com, 1 page Jul. 16, 2007.
Summarizing Personal Web Browsing Sessions [online], [retrieved Jul. 16, 2007] Retrieved from Internet URL: http://www.cs.washington.edu/homes/mirad/research/summaries, 2 pages. Jul. 16, 2007.
Tably [online], [retrieved Jul. 16, 2007] Retrieved from Internet URL: http://www.tably.com/defaulttab.asp, 1 page. Jul. 16, 2007.
Trailfire [online], [retrieved Jul. 16, 2007] Retrieved from Internet URL: http://www.trailfire.com, 4 pages. Jul. 16, 2007.
Tucows Downloads—Web Stasher 1.5 Shareware Software [online], [retrieved Jun. 18, 2007] Retrieved from Internet URL: http://www.tucows.com/preview/319605, 4 pages. Jun. 18, 2007.
Uhuroo—Help Kaboodle [online], [retrieved Jul. 16, 2007] Retrieved from Internet URL: http://www.uhuroo.com/uweb/html/help/htm, 5 pages. Jul. 16, 2007.
WebWorkshop—Google's PageRank Explained [online], [retrieved Mar. 23, 2006] Retrieved from Internet URL: http://www.webworkshop.net/pagerank.html?pm=y, 15 pages. Mar. 23, 2006.
Welcome to webOutliner [online], [retrieved Jul. 16, 2007] Retrieved from Internet URL: http://www.weboutliner.com, 2 pages. Jul. 16, 2007.
Wists, Wists social shopping beta, [online], [retrieved Mar. 22, 2006] Retrieved from wists.com Internet URL: http://www.wists.com, 3 pages. Mar. 22, 2006.
Wridea [online], [retrieved Jul. 16, 2007] Retrieved from Internet URL: http://www.wridea.com, 3 pages. Jul. 16, 2007.
Yoono, People Powered [online], [retrieved Jul. 16, 2007] Retrieved from Internet URL: http://www.yoono.com/index.isp, 1 page. Jul. 16, 2007.
Notification of First Office Action, Chinese Appl. No. 200780026084.4, dated Jul. 12, 2010, 14 pages Jul. 12, 2010.
International Search Report & Written Opinion, PCT/US2007/068695, dated Oct. 31, 2007, 13 pages, dated Oct. 31, 2007.
EverNote Corporation, User manual for EverNotes Plus, Copyright 2005, [online], [retrieved on Mar. 22, 2006] Retrieved from EverNote Corporation using Internet URL: http://www.evernote.com/en/products/evernote/features.php, 2 pages. Mar. 22, 2006.
Jeteye Technologies, Inc., Jeteye beta tour, Copyright 2005, [online], [retrieved on Mar. 22, 2006] Retrieved from Jeteye Technologies, Inc. using Internet URL: http://www.jeteye.com, 1 page. Mar. 22, 2006.
Lifehacker—Create a store and earn commissions with Zlio—Lifehacker [online], [retrieved Jul. 16, 2007] Retrieved from Internet URL: http://www.lifehacker.com/software/sales/creat-a-stor-and-earn-commissions-with-zlio-234655.php, 2 pages. Jul. 16, 2007.
CN Office Action in Application No. 201210441657.2, dated Jun. 21, 2016, 13 pages (with English translation) dated Jun. 21, 2016.

* cited by examiner

PRESENTING SEARCH RESULT INFORMATION

TECHNICAL FIELD

The description relates to ranking search results, or generating snippet information for search results, using information in a notebook.

BACKGROUND

When users enter a search term into a search engine, the resulting search hits are often presented in a particular order. This is the case with virtually all search engines available on the web. Upon receiving this response from the search engine, the user can then peruse the results at will, beginning either with the first listed search result or proceeding to one lower on the list.

The search results are presented in a certain order for different reasons. First, the markup languages commonly used for presenting web-oriented information are more geared toward presenting information in a structured way (e.g., as a list of items having a top and a bottom) than in an unstructured way (e.g., as an unsorted group of items). Second, the results may be deliberately placed in a certain order according to the relevance of each individual hit. This may generally be referred to as ranking the search results, because they are placed in an order decided by an algorithm or by some other predefined decision process. For example, when the Google™ search engine presents the results from a search, it ranks the responsive pages according to backlinks; that is, according to the number of other web pages that link to the page in question. Thus, the ranking is performed by taking into account other information that the search engine can access (the number of backlinks) and that is relevant in deciding which of the web pages represented by the search result the user may be most interested in reviewing.

Another feature that helps the user facing many search hits is the approach of presenting snippet information together with some or all of the search hits. Generally speaking, the snippet information is a portion of (usually textual) content from the corresponding web page. This information is automatically retrieved and displayed in the search results together with the title of the web page, or otherwise in connection with a link that can be used for accessing the web page. The snippet information is presented because it may help the user decide whether the page is relevant without having to open the page (which may take some time). Thus, the snippet information is generated using other information that the search engine can access (content of the web page) and that is relevant in deciding which of the web pages represented by the search result the user may be most interested in reviewing.

Individuals sometimes create information collections online that reflect their interests. For example, some approaches have been made to let users clip content from web pages and store this information for later use. The benefit of this is that the user can gather, in a single place, information from several sources that relate to a common topic, yet that may not be available from those sources in the future (because web pages are sometimes revised or removed). Such a document, formed by a user's selection of content from various web documents and collection of that content together in one place, is known as a web notebook.

A web notebook may be made available to users other than its author, and thus may be indexed and searched by the users.

SUMMARY

The present document describes presenting computer-generated search result information. In general, search results are shown to have their presentation or order affected by the content of web notebooks. For example, web pages referenced by a notebook whose title, or one of its headings, is "Tasmania" may contain entries from a number of pages that by strong inference show information from New Zealand. This information may be used to increase the rank of each of the referenced web pages for searches on terms like "New Zealand" over and above the ranking that would otherwise be given the pages.

In some implementations, a method of presenting computer-generated search result information includes receiving a search request from a client computer; identifying a plurality of search results responsive to the search request; ranking the plurality of search results using content in one or more web notebooks; and providing the ranked plurality of search results for presentation in the client computer.

Ranking can include first ranking the plurality of search results without using the content, and thereafter modifying the ranked search results using the content. Using the content can include determining whether at least one of a title, a heading, clipped content, metadata or a user-annotation in at least one web notebook relates to the search request and, if so, increasing a ranking of at least one search result referenced by the at least one web notebook. Performing the ranking further can include analyzing backlinks corresponding to the plurality of search results. The one or more web notebooks can be selected for use in the ranking based on an identity of a user that initiates the search request. The web notebooks can be ranked before the plurality of search results is received, and the ranking of the web notebooks can be taken into account in ranking the plurality of search results. Use of the content in performing the ranking can be triggered by an instruction included in the search request. At least one search result from the plurality of search results can be selected from the group consisting of a map search result, a shopping search result and a book search result.

In some implementations, the method can further include generating, after identifying the plurality of search results, snippet information by identifying portions of documents associated with the search results that have been referenced in the web notebooks. The snippet information can be provided to the client computer with the search results. In some implementations, the method can further include identifying a first search result that is referenced in the one or more web notebooks and identifying a second search result that is not referenced in the one or more web notebooks; the ranking can include ranking the first search result higher than the second search result.

In some implementations, a method of presenting computer-generated search result information includes receiving a user input corresponding to a search request; forwarding the search request to a server computer for identifying a plurality of search results responsive to the search request; and receiving the plurality of search results from the server computer, the plurality of search results being ranked using content in one or more web notebooks.

One or more web notebooks can be selected for use in the ranking based on an identity of a user that provides the user input. The ranked plurality of search results can further include snippet information that the server computer generates by identifying portions of documents associated with the search results that have been referenced in the one or more web notebooks. The search request can further include an instruction for the server computer to rank the plurality of search results using the content. In some implementations, the method further includes displaying the ranked plurality of search results.

In some implementations, a method of presenting computer-generated search result information includes receiving a search request from a client computer; identifying a plurality of search results responsive to the search request; and generating snippet information to be transmitted to the client computer with the search results by identifying portions of documents associated with at least one search result of the plurality of search results that have been referenced in one or more web notebooks.

Snippet information can be generated by obtaining, for at least one search result included in the plurality of search results, a portion of content that is included in the one or more web notebooks. The search request can include an instruction to identify the portions of the documents in generating the snippet information. The content can include at least one of a title, a heading, generated snippet information, metadata or a user-entered annotation.

In some implementations, the method further includes displaying an indication of a number of the one or more web notebooks that reference the at least one search result. In some implementations, the method further includes providing a link that, upon activation, provides access to the one or more web notebooks. In some implementations, the method further includes ranking the plurality of search results using content in the one or more web notebooks. In some implementations, the method further includes forwarding the plurality of search results and the generated snippet information to a client computer from which the search request was received.

The systems and methods just described may provide one or more of the following advantages. Searchers may be provided with more accurate searches that are based on "votes" from other users. Also, a search provider may benefit from being able to provide more useful results, and thereby draw more users.

The details of one or more implementations are set forth in the accompanying drawings and the description below. Other features, objects, and advantages will be apparent from the description and drawings, and from the claims.

BRIEF DESCRIPTION OF THE DRAWINGS

Like reference numerals in the various drawings indicate like elements.

DETAILED DESCRIPTION

Figure 1:
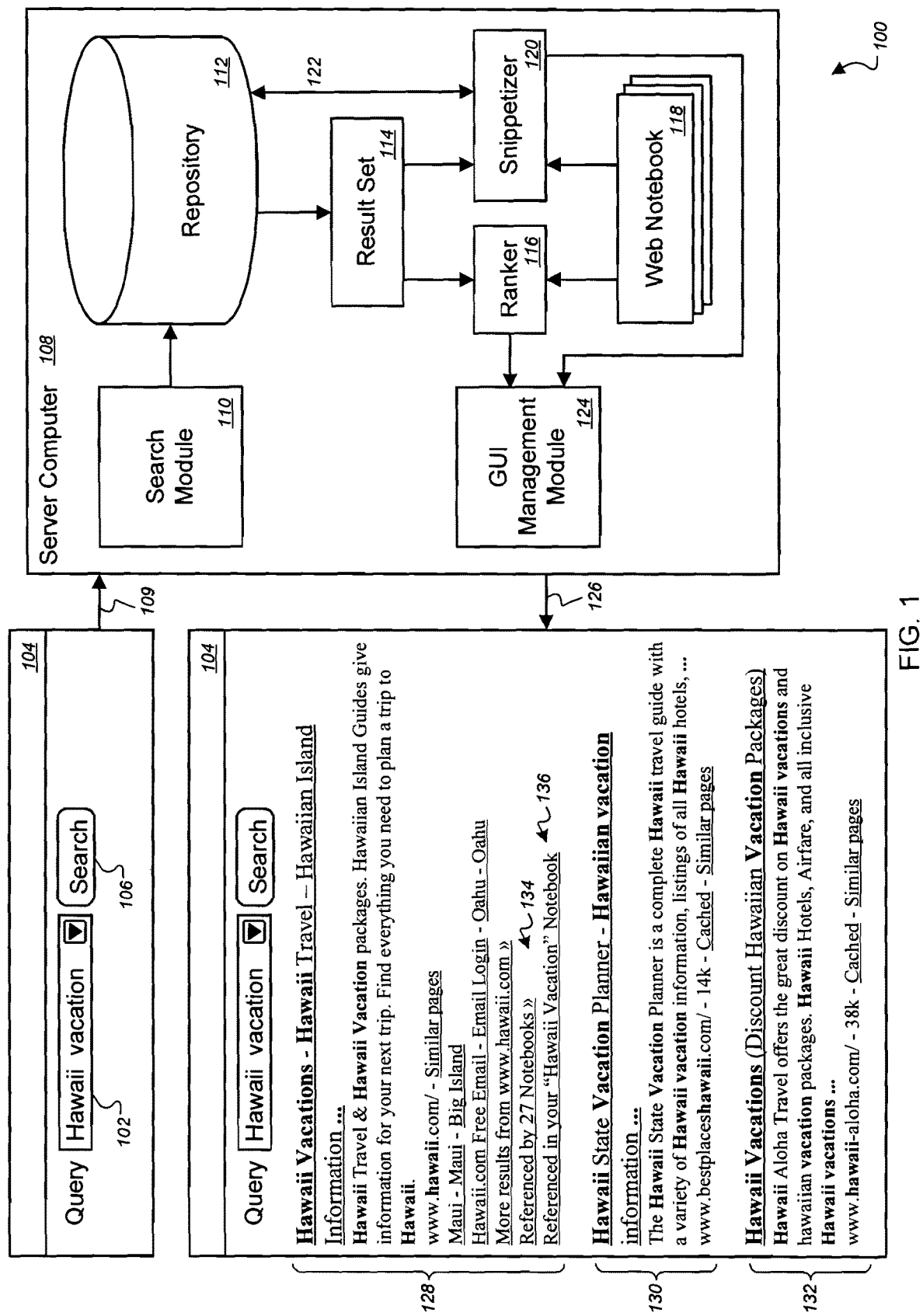
FIG. 1 shows an example of a computer system in which a ranker or a snippetizer uses content from at least one web notebook in processing a query from a web browser.

FIG. 1 shows an example of a computer system 100 in which a ranker or a snippetizer uses content from at least one web notebook in processing a query from a web browser. For example, a user may be planning a vacation to Hawaii, and may want to review web sites pertaining to his or her vacation plans. The user therefore enters a search phrase (e.g., "Hawaii vacation") into a query field 102 in a web browser 104. The user enters the phrase on a client computer such as a home computer, work computer, cell phone or PDA, to name a few examples. When a search phrase has been entered in the query field 102, the user can click a search button 106 to cause the client computer to forward a corresponding search request to a server computer 108, as indicated by an arrow 109. For example, the web browser (e.g., on the user's home computer) can send the query across the Internet. The server computer 108 can include one or more web servers that provide search engine services by publishing one or more web pages, for example the page currently shown in the browser 104.

The server computer 108 includes a search module 110 that receives and processes the search request. For example, processing the request can include parsing the query and formulating the instructions necessary to execute the query within the server computer 108. The search module 110 can then perform the requested search on data in a repository 112. For example, the repository 112 can contain indexing and content information obtained by automatically accessing web pages (or other content, such as images, video, books, maps, scholarly articles, product or service information, etc.) and retrieving and organizing all or part of their contents. For example, a search request that includes "Hawaii vacation" can result in a result set 114 that contains information identifying web pages that are responsive to the search request. The information in the result set 114 can presently be organized in the order that it is retrieved from the repository 112, or it may be unorganized, to name two examples. One repository 112 is shown, but the multiple repositories can be employed (e.g., one distributed repository for each corpus of content).

A ranker 116 can rank the entries in the result set 114. The ranking can use contents of one or more web notebooks 118 that are available in the server computer 108. For example, if the notebook contains content from a web page (e.g., text, images, video, books, maps, scholarly articles, product or service information, etc.) that is also included in the result set 114, that web page can receive a higher rank. In some implementations, the ranker 116 can assign the highest ranks to content from the result set 114 that corresponds to existing notebook 118 entries. In other implementations, the ranker 116 can match the title of a web notebook 118 with the web browser query to identify that notebook as relevant and then elevate the rank of pages in the search result that also occur in that web notebook 118. Presentation of the search result set to the user will be described below, as will some examples of how the web notebooks can be generated.

A snippetizer 120 provides snippet information for some or all hits in the result set 114. The snippet information can include short summaries of the webpage for display in the results area of a web browser. The snippetizer 120 can use information in one or more of the web notebooks 118 to generate the snippet information. For example, words, phrases, images, maps, etc., from a page that the user has clipped into the notebook can be given preference in generating snippet information for that web page. For pages in which the snippet information is not obtained from the web notebook(s) 118, the snippetizer 120 can use information from the repository 112 as indicated by an arrow 122, for example to extract content from the web page according to an algorithm.

When ranking and/or snippetizing is complete, a GUI management module 124 sends the ranked search results and the snippet information to the browser 104 for display, as indicated by an arrow 126. The information can be sent over the Internet, for example to the user's home computer from which the web search originated. The client computer receives the ranked search results, which may include the snippet information, and updates the display on the web browser 104 accordingly. The search results can be displayed whether they are ranked using the web notebooks 118, snippetized using the web notebooks 118, or both ranked and snippetized using the web notebooks 118.

For example, result entry 128 (e.g., from www.hawaii.com) can be the first entry in the web browser 104 if it received a higher ranking than result entry 130 (e.g., representing website www.bestplaceshawaii.com) and all other result entries. The higher ranking can result, for example, if the ranking mechanism used by the ranker 116 determined that www.hawaii.com outmatched www.bestplaceshawaii.com to the search request. The higher ranking can be based on the level of matches (e.g., using key words from the search request) between the search request and indexing within the repository 112. For example, a web site matching all of the keywords in the search request would receive a higher ranking than one matching just some of the keywords. Furthermore, the higher ranking can be based on an analysis of the contents of the web notebooks 118. For example, a web site matching a title, heading, user-annotation, metadata or clipped content from a web notebook 118 can receive a higher ranking than one that matched no web notebooks. Result entry 132 (e.g., from www.hawaii-aloha.com) can have a lower ranking if the ranker determined that it was less of a match to indexes in the repository 118 and information in existing web notebooks 118. In some implementations, groups of result entries all having an equal rank can be displayed in any order, as long as the overall ranking order is preserved.

In some implementations, additional links can be provided for one or more search results. For example, a link 134 is depicted with the search result 128. The link 134 can provide an indication of a number of web notebooks that reference the corresponding search result (e.g., search result 128). In some implementations, the number can correspond to a total number of web notebooks that reference the search result, regardless of whether the web notebooks are public or private web notebooks. (Public and private notebooks are described in greater detail below.) In other implementations, the number can correspond to a number of public notebooks that reference the corresponding search result. In some implementations, activation of the link 134 can provide access to one or more of the web notebooks that reference the corresponding search result (e.g., the public web notebooks, or the web notebooks corresponding to a user who entered the search request (e.g., as determined by a login, cookie, or other authentication or access-control method)).

As another example, a link 136 can be provided when a search result is referenced by a user's own web notebook. As mentioned above, a user can, in some implementations, log into an interface in order to obtain access to his or her web notebooks, and once logged in from a particular client device, the client device can be associated with an account of the user (and any corresponding web notebooks maintained by the user). When search results, such as the search result 128, are referenced by the user's own web notebooks, the link 136 can be provided. In some implementations, activation of the link 136 can facilitate access to the corresponding web notebook(s) that reference the search result. For example, a pop-up window could be provided that displays content from the corresponding web notebook, or when multiple web notebooks reference a search result, a pop-window (or other appropriate control) could enable the user to select a particular web notebook to view, or other action to take with respect to a particular web notebook.

Result entries 128, 130 and 132 can include snippets based on information obtained from the repository 112 and web notebooks 118. Each snippet, for example, can contain a summary of the corresponding web site, one or more links to the web site, and links to any associated web notebooks 118. For example, result entry 128 (e.g., from www.hawaii.com) can have a snippet that includes phrases derived from the repository 112 and existing web notebooks 118 pertaining to Hawaii vacations. In some implementations, each snippet can be formatted and displayed to show correlations between the search request and existing web notebooks. For example, words or phrases in the snippet can be highlighted if they match the original search query. The web browser 104 can further highlight words or phrases in a snippet from a web page that match the titles or contents of any existing web notebooks 118. This additional highlighting can be different from other highlighting to differentiate it as unique to web notebooks where portions of the snippet have been clipped to the web notebook. In some implementations, the snippet can further contain links to the corresponding web notebooks. This can, for example, allow the user to access any notebook that relates to the snippet.

Figure 2:
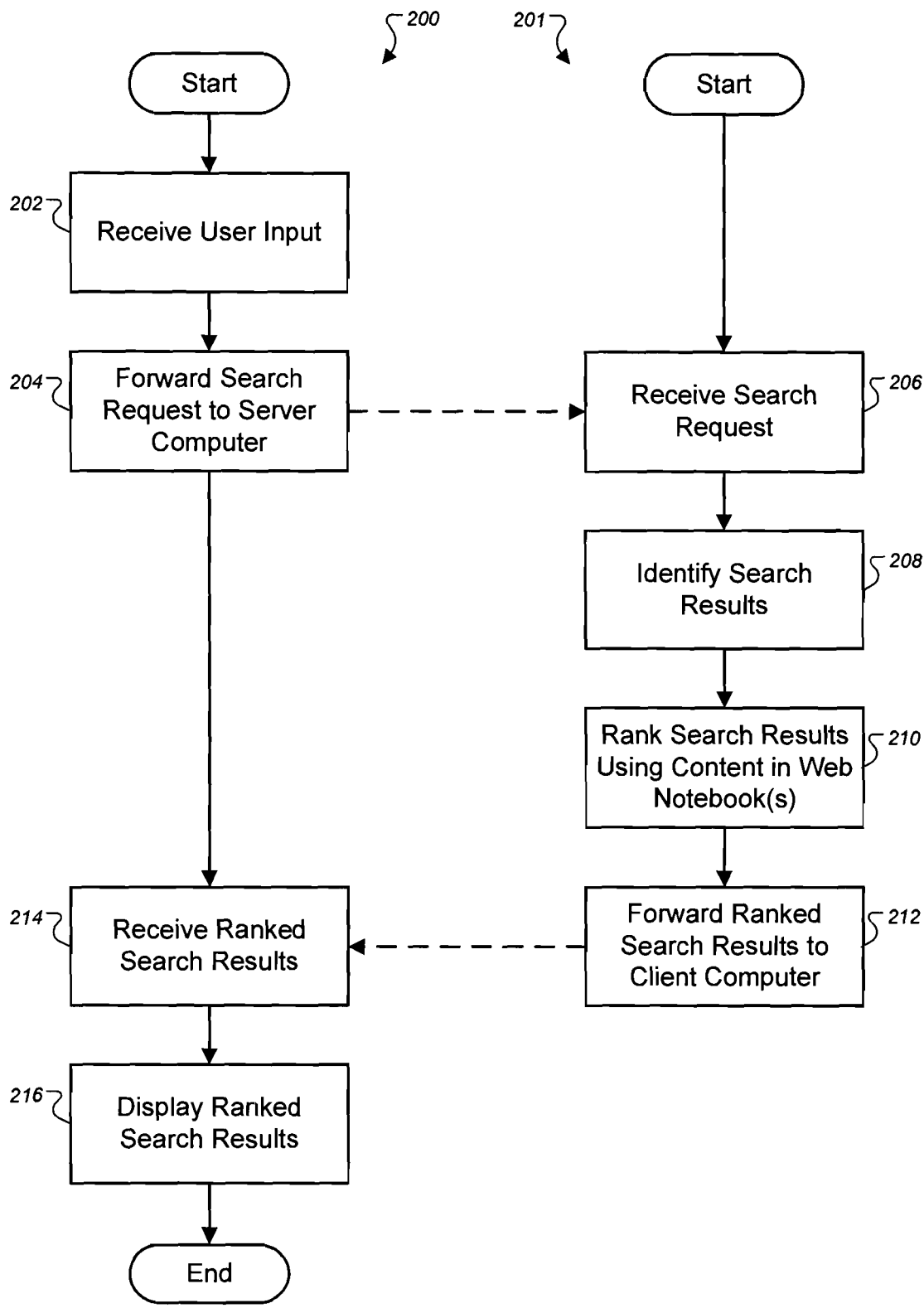
FIG. 2 is a flow chart of exemplary operations relating to presenting computer-generated search result information, the results having been ranked using web notebooks.

FIG. 2 is a flow chart of exemplary operations 200 and 201 relating to presenting computer-generated search result information, the results having been ranked using web notebooks. Operations 200 are performed on a client computer; operations 201 are performed on a server computer. For example, the operations 200 and 201 can be performed in the computer system 100.

The operations 200 and 201 begin in step 202 with receiving a user input on the client computer. For example, referring to FIG. 1, the browser 104 receives a search phrase (e.g., "Hawaii vacation") that the user enters into the query field 102. The user enters the query on a client computer such as a home computer, work computer, cell phone or PDA, to name a few examples.

In step 204, the client computer forwards the search request to the server computer. For example, referring to FIG. 1, forwarding the search request can occur when the user clicks the search button 106 after completing the query field 102 within the web browser 104. The corresponding search request is forwarded across a network to the server computer 108 (e.g., operated by a content provider), as indicated by the arrow 109. For example, the network can be the Internet, and the request can be in the form of an HTTP request.

In step 206, the search request is received on the server computer. For example, referring to FIG. 1, the search request can be received by the search module 110 within the server computer 108. In some implementations, the search module 110 can parse the search request and prepare instructions for execution within the server computer 108.

In step 208, the server computer identifies a plurality of search results responsive to the search request. The search results could include any kind of content, or multiples kinds of content, such as, for example, text search results, video search results, image search results, book search results, scholarly article search results, map search results, search results relating to product or service information, or any other kind of content typically provided by a search engine, which may or may not be associated with a particular class or corpus of content. Referring to FIG. 1, the search module 110 can execute the requested search in the repository 112. The requested search can be facilitated by using indexing and content information stored in the repository 112. For example, a search request that includes "Hawaii vacation" can result in a result set 114 that contains information identifying web pages that are responsive to the search request.

In step 210, the plurality of search results are ranked using content in one or more web notebooks. For example, referring to FIG. 1, the ranker 116 can rank the web content entries in the result set 114 using contents of one or more web notebooks 118. As an example, the ranking can be higher for web content from one or more web pages that the user notebooked at an earlier time.

In some implementations, a higher rank can be given to web content (e.g., images, text, videos, maps, etc.) that has been added to a notebook having a title, heading, metadata, annotation, etc., that is the same or similar to a request. For example, a web page about a café can be given a higher ranking in a search for "Italian restaurants" even if the page says nothing about Italy or restaurants, if the page has had content clipped into a notebook under the heading or title of "Italian Restaurants." In such an implementation, the assumption can be that the page relates to Italian Restaurants because the author of the web notebook captured part of its content under such a caption. The ranked search results are provided to the GUI management module 124.

In step 212, the ranked search results are forwarded to the client computer. For example, referring to FIG. 1, the GUI management module 124 can send the ranked search results to the web browser 104 on the client computer, as indicated by the arrow 126. The information can be sent over the Internet, for example to the user's home computer from which the web search originated.

In step 214, the ranked search results are received by the client computer. For example, referring to FIG. 1, the ranked search results are received by the web browser 104. The web browser may be on a home computer, work computer, cell phone or PDA, to name a few examples.

In step 216, the ranked search results are displayed on the user's client computer. For example, referring to FIG. 1, the web browser 104 can display the ranked search results in the results area of the user's computer screen. In one example, the display can be updated to list web pages matching the user's original query (e.g., "Hawaii vacation").

Figure 3:
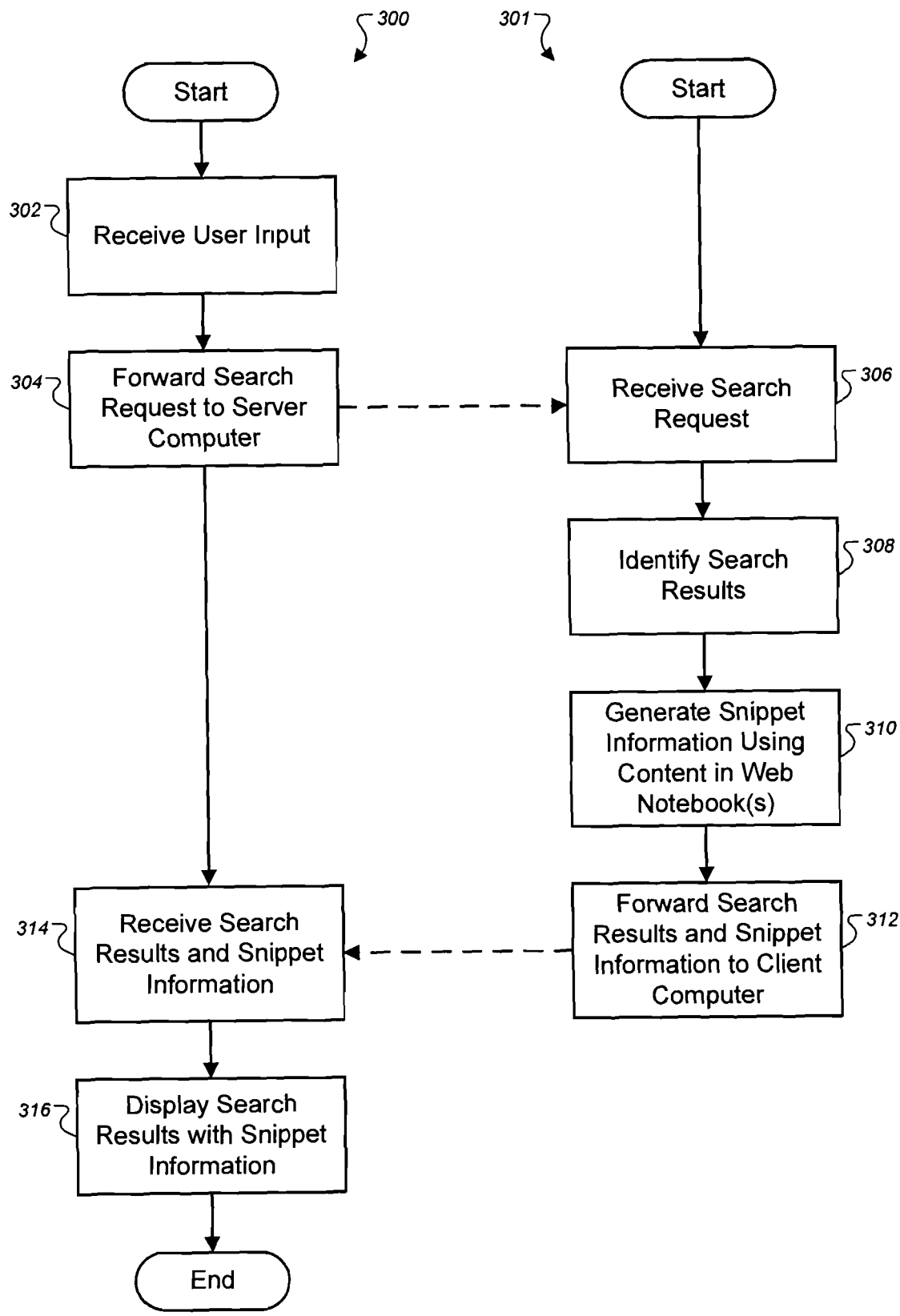
FIG. 3 is a flow chart of exemplary operations relating to presenting computer-generated snippet information with search results, the snippet information being generated using web notebooks.

FIG. 3 is a flow chart of exemplary operations 300 and 301 relating to presenting computer-generated snippet information with search results, the snippet information being generated using web notebooks. Operations 300 are performed on a client computer; operations 301 are performed on a server computer. For example, the operations 300 and 301 can be performed in the computer system 100.

The operations begin in step 302 with receiving a user input on the client computer. For example, referring to FIG. 1, the browser 104 receives a search phrase (e.g., "Hawaii vacation") that the user enters into the query field 102. The user enters the query on a client computer such as a PDA, home computer, work computer or cell phone, to name a few examples.

In step 304, the client computer forwards the search request to the server computer. For example, referring to FIG. 1, forwarding the search request can occur when the user clicks the search button 106 after completing the query field 102 within the web browser 104. The corresponding search request is forwarded across a network to the server computer 108 (e.g., within a content provider), as indicated by the arrow 109. For example, the network can be the Internet.

In step 306, the search request is received on the server computer. For example, referring to FIG. 1, the search request can be received by the search module 110 within the server computer 108. In some implementations, the search module 110 can parse the search request and prepare instructions for execution within the server computer 108.

In step 308, the server computer identifies a plurality of search results responsive to the search request. For example, referring to FIG. 1, the search module 110 can execute the requested search in the repository 112. The requested search can be facilitated by using indexing and content information stored in the repository 112. For example, a search request that includes "Hawaii vacation" can result in a result set 114 that contains information identifying web pages that are responsive to the search request.

In step 310, the server generates snippet information to be transmitted to the client computer with the search results. The snippet information is generated by identifying portions of documents associated with the search results that have been referenced in one or more web notebooks. For example, referring to FIG. 1, the snippetizer 120 can generate snippet information for the web content entries in the result set 114 using the contents of one or more web notebooks 118. As an example, the snippetizer 120 can identify portions of documents associated with the search results that have been referenced in one or more web notebooks. For pages having no associated web notebook(s) 118, the snippetizer 120 can use information from the repository 112 to create snippet information, as indicated by an arrow 122. Alternatively, notebook information may be used to identify relevant web pages, while information from each web page itself may be matched to a request to identify a snippet. The search results and snippet information are then provided to the GUI management module 124, which may include, for example, one or more web servers.

In step 312, the search results and snippet information are forwarded to the client computer. For example, referring to FIG. 1, the GUI management module 124 can send the search results and snippet information to the web browser 104 on the client computer, as indicated by the arrow 126. The information can be sent over the Internet, for example to the user's PDA from which the web search originated.

In step 314, the search results and snippet information are received by the client computer. For example, referring to FIG. 1, the search results and snippet information are received by the web browser 104. The web browser may be on a home computer, work computer, cell phone or PDA, to name a few examples.

In step 316, the search results and snippet information are displayed on the user's client computer. For example, referring to FIG. 1, the web browser 104 can display the search results and snippet information in the results area of the user's computer screen. In particular, the results area can list summaries and links to web pages matching the user's original query (e.g., "Hawaii vacation").

Figure 4:
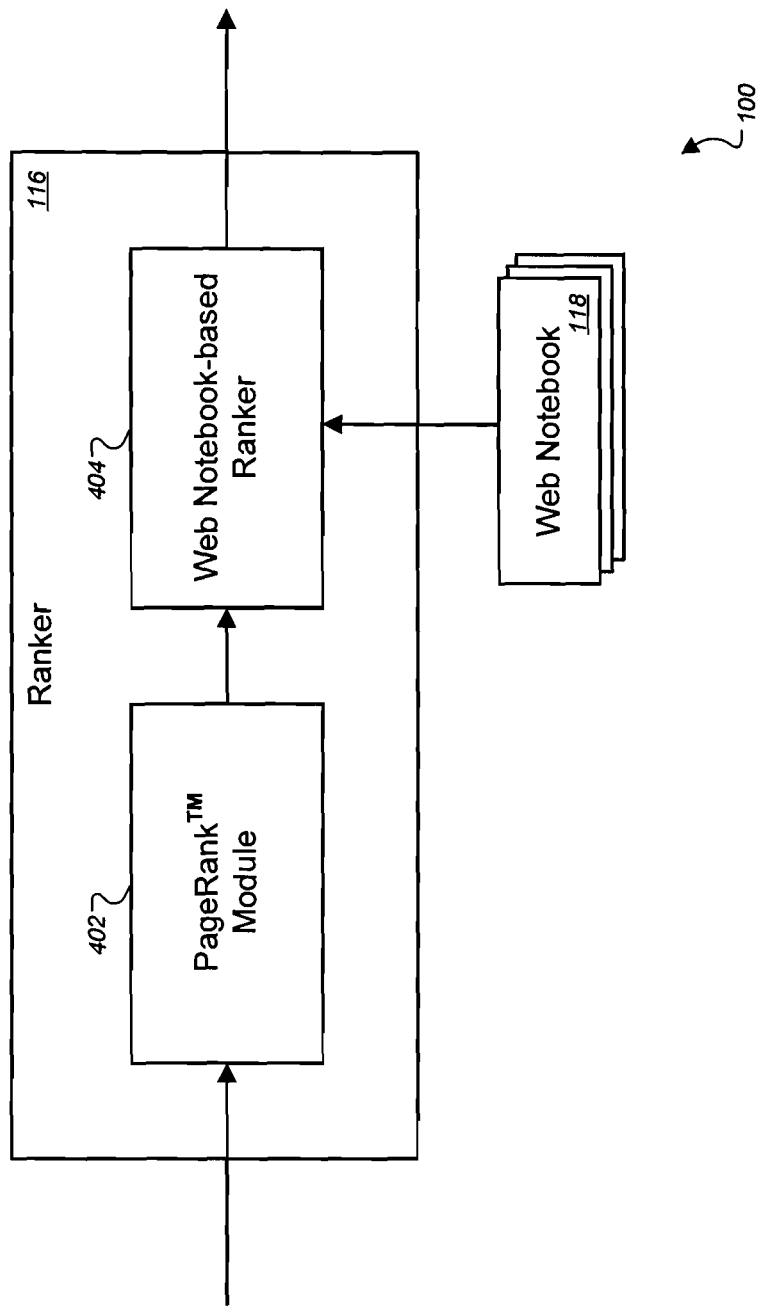
FIG. 4 is a block diagram of an exemplary ranking system that can be used in ranking search results using web notebooks.

FIG. 4 is a block diagram of an example of the ranker 116 that can be used in ranking search results using web notebooks. Here, the ranker 116 operates using two submodules: a PageRank Module 402 and a web notebook-based ranker 404.

The PageRank Module 402 uses backlinks to determine ranking. This type of ranking is based on the number of other web pages that link to each of the pages in the search results. More particularly, the PageRank Module 402 assigns a higher rank the more backlinks a webpage has. In addition, the PageRank Module 402 may provide a higher weight to certain backlinks, such as when the backlinked page is itself linked to other pages having content that is responsive to the request.

The web notebook-based ranker 404 uses the content of web notebooks to determine ranking. Web notebook content can include titles or headings in the web notebooks, snippets that have been clipped into the web notebooks, user-supplied annotations or user-supplied free-form text, metadata associated with web notebooks (e.g., metadata that identifies a corresponding search request, a time/date stamp, or other information related to a snippet, annotation, heading, title, etc.), and other information stored in the web notebooks.

Ranking can be based on the extent to which the search results match content in existing web notebooks. For example, the web notebook-based ranker 404 can assign a higher rank to search results corresponding to websites matching content of web notebooks. In particular, if the user enters a search query for "Hawaii vacation" in the web browser 104, the web notebook-based ranker 404 can rank the corresponding search results based on whether existing web notebooks that contain content clipped from the search results have titles matching the keywords (e.g., "Hawaii" and "vacation") or contain clipped content matching the keywords. In addition, the web notebook-based ranker 404 can assign higher ranks to search results matching a greater number of notebooks and/or a greater number of occurrences of keywords within those notebooks. In each instance, respectively, the system may presume that notebook authors select descriptive titles for content they clip, that clipped content matching keywords is a more important part of a web page than is unclipped content, or that the number of clippings from a web page reflects its perceived usefulness to users in general.

In operation, the ranker 116 may first cause the PageRank Module 402 to rank the search results based on backlinks. Then, the ranker 116 can cause the web notebook-based ranker 404 to modify the ranking of the search results based on their relevance to existing web notebooks. For example, the web notebook-based ranker 404 can modify the initial ranking order of the search results according to existing web notebooks related to Hawaiian vacations. The result can be a reshuffling of the previous ranking order according to notebook content.

Alternatively, the ranker 116 can first cause the web notebook-based ranker 404 to rank the search results based on their relevance to existing web notebooks. For example, the web notebook-based ranker 404 can initially rank the search results based on their match to existing web notebooks related to Hawaiian vacations. Then, the ranker 116 can cause the PageRank Module 402 to further rank the search results based on backlinks. The result can be a reshuffling of the web notebook-based order based on backlinks. For example, the ranker 404 can divide the result in groups of notebook-included pages and non-notebook-included pages, and the ranker 402 can thereafter modify the ranking within any of these groups. The system may maintain the notebooks 118 separately from web content, such as in a central database, so as to access the data separately for different purposes.

Instead of the PageRank module 402, another ranker can be used, for example one that analyzes content of a web page in a particular manner. In particular, a ranker can assign higher ranks to web pages which more frequently use key words associated with the web search. This type of ranking can be based on the extent of the match between the web page content of the search results and the user's search request. For example, if the user enters a search query for "Hawaii vacation" in the web browser 104, the ranker can rank the corresponding search results based on whether they contain the key words (e.g., "Hawaii" and "vacation") corresponding to the user's search query. More particularly, the ranker can assign a higher rank based on how many key words are matched, the frequency that each key word is used in the web page, and the relative location of words in the query compared to the relative location in the web page. For example, a search result corresponding to a web site containing several occurrences of both "Hawaii" and "vacation" can receive a higher ranking than other search results corresponding to web sites that contain just a few of either key word.

There will now be described some examples of how the web notebook(s) 118 can be generated and maintained.

Figure 5:
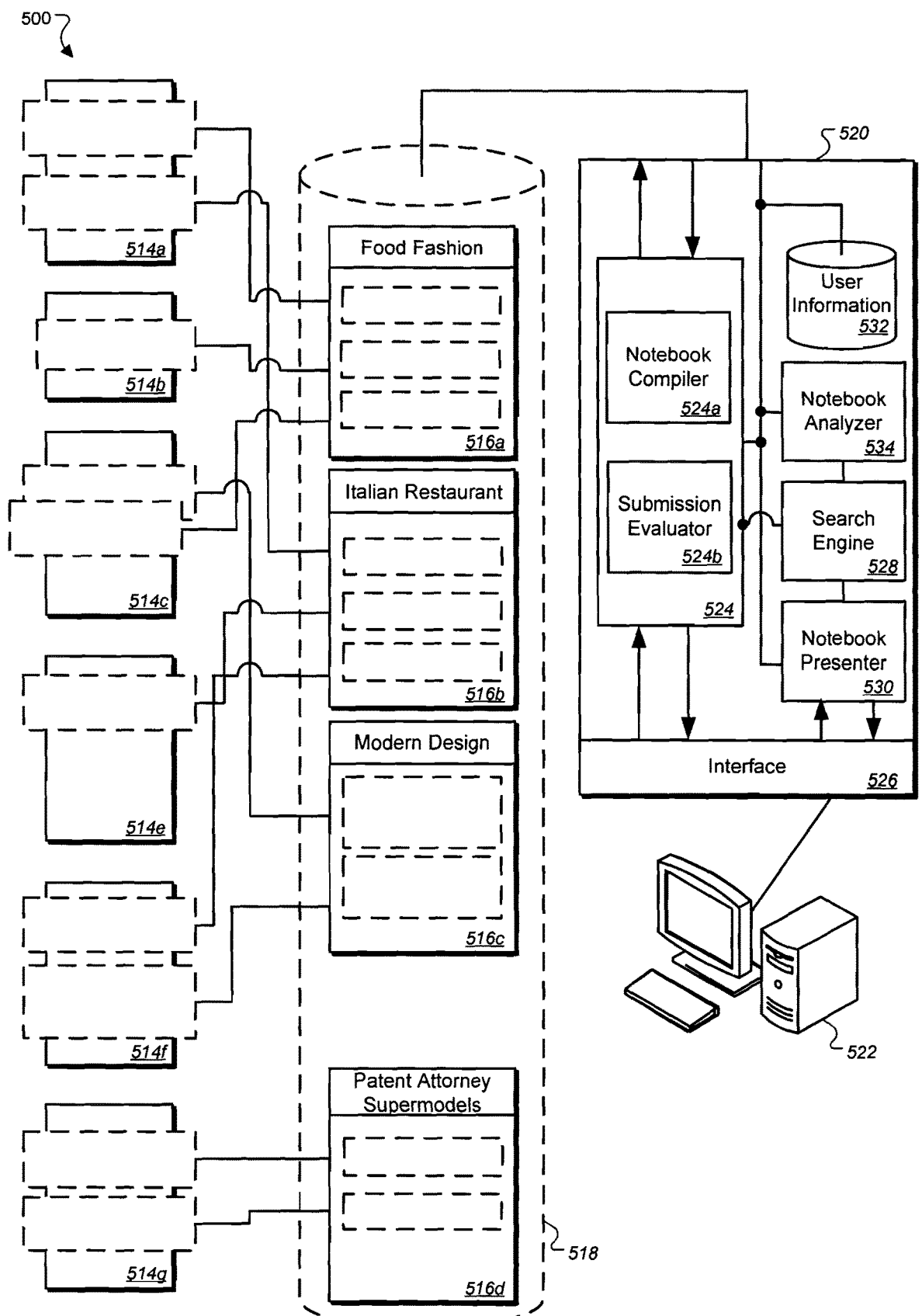
FIG. 5 is a schematic diagram of a system for organizing web-based content in web notebooks.

FIG. 5 is a schematic diagram of a system 500 for organizing web-based content in web notebooks. In general, the system 500 organizes notebooks 516a-516d in notebook database 518 when users of system 500 select content from web pages 514a-514g. Notebook manager 520 contains components to permit creation, modification, and management of notebooks, and access to the notebooks by users and others. As pictured, the system 500 uses a hosted notebook arrangement, i.e., one in which at least a substantial portion of the notebook information is stored on one or more central servers rather than being stored at each user's computer.

The web pages 514a-514g and notebooks 516a-516d show two exemplary ways to present web content. The web pages 514a-514g are prepared, for example, by various third parties and are located by users of the system 500, for example, by browsing the web. The notebooks 516a-516d are derivative documents prepared by users of the system, and are, in essence, conglomerations or compilations of other information from various sources that the users grouped together. They are derivative in the sense that some or all of their content may originate from other sources, such as web pages. For example, a user may compile a web notebook to include information from various retail stores' web pages showing store hours for Black Friday—the day after Thanksgiving.

Such compiled content may be more helpful to readers than would be links to the retailers' own web pages because the notebook allows review of the information in a single page, without the need for navigating between and among various pages. In addition, in normal situations, links might not take the viewer directly to the relevant content—even if the links lead to areas within a web page—because the viewer may be distracted by information they see around the relevant content. By clipping a portion of the web page content, a notebook author may provide only the information that is needed for their purposes.

Notebooks 516a-516d can be created by a user navigating various web pages and clipping pieces of content from each of the web pages. As described below, the clipped content may then be pasted or dropped (in various manners—both manual and automatic) into web notebooks. Though shown as web pages 514a-514g, the documents may take the form of any appropriate network-accessible document, such as other documents authored in a mark up language. Examples of such possible formats include SGML, XML, TeX, and XHTML, to name a few.

The web pages 514a-514g may contain a variety of appropriate content. For example, web page 514a may be a page for a gourmet Italian restaurant, while page 514b may be a web page of a food photographer. Page 514c may be a page for an Art Deco restaurant, while web page 514e may also be for an Italian restaurant. Web page 514f may be for a modern Italian restaurant, while web page 514g may be a page of a patent law firm.

Connecting lines show example correspondence between content taken from web pages 514a-514g, and web notebooks 516a-516d. For example, a user who enjoys nice looking food may browse web sites such as restaurant web site 514a and others, and may select photographs from those web sites to show together on the users' notebook page. Likewise, a user who creates notebook 516b may be a fan of Italian cuisine, and may thus clip content from a variety of Italian restaurant web pages in an area to provide a combined page that shows the best restaurants in the area (at least according to the user). For example, page 514c might be the web site for a high-end Italian restaurant, with pictures of beautifully presented food. A user creating notebook 516b may have placed a portion (e.g., a menu and address) of the page in a notebook they have captioned "Italian Restaurants" and another user (of notebook 516a) may have placed another portion (e.g., a photo of a beautiful cannoli) on a "Food Fashion"-captioned notebook Each dashed box in the figure represents content from the web pages 514a-514g that has been captured by users of the system into notebooks 516a-516d. The boxes are shown in a rectangular shape consistent with many standard approaches for content selection, although content may be selected in any appropriate manner by a user. Such content may be captured in a variety of manners. For example, users may drag a mouse across content in a web page, in a well-known manner, or a computer system may default to selecting content with particular mark up tags (e.g., heading tags) and select that content automatically, or semi-automatically (e.g., selecting the content, but giving the user the right to approve the clipping of the content). For example, a notebook author may be an artist looking for pictorial inspiration, and may configure a notebook application to select only images for clipping to a notebook. In such a situation, all images on a page may be selected and clipped whenever the user makes a clipping command; the user may then be given the option at that point to discard some figures, or may return to the notebook later and delete any figures they did not want clipped to the notebook.

As another example, a user may be looking only to make an outline in a web notebook, and the user may configure the notebook application such that any selection clips only the titles or headings from a group of selected content (or clips all titles and headings if no content is currently selected). After browsing a number of web sites and selecting content, the user can then view the notebook, find interesting headings or title, and use controls in the notebook application to return to the corresponding web pages to collect additional content.

In addition, the system may search for custom tags that a web page author places in the page to guide clipping, e.g., "overview" tags that mark the beginning and the end of information that summarizes the content of a page. Also, a standard may define such special tags in various manners, such as "vertically" for specific types of web sites, e.g., financial, travel, etc., or for other uses. Allowing such custom definition of tags may permit the system to be extensible to more uses, and thus more helpful to users of system 500 and operators of system 500.

Information in addition to the clipped material may be added to notebooks 516a-516d. For example, users may employ controls in a notebook development application to add headings, subheadings, comments, annotations and free-form text that they have prepared themselves to the notebook. Users may also add metadata to a notebook (e.g., the users may configure a web notebook to automatically add certain metadata, or the web notebook may add such metadata by default), such as identification of the notebook type, the user who created the notebook, users who may access the notebook, the level of access allowed, information regarding a related search request, time/date stamp information, etc.

Various forms of information may be stored in notebooks 516a-516d. For example, HTML or other mark up code itself may be stored, and various clippings may simply be set in sequence in the document. Alternatively, clippings or notes may be stored individually, and may also be pointed to by placeholders in a notebook.

Metadata about particular entries in a notebook may also be stored. The metadata may include the URL from which the material was clipped, the time/date it was clipped, indicators of the amount of content in a web page before and after the content that is clipped (e.g., so that one could return to the web page later and infer where the material came from in the page even if the material itself has changed in the interim).

Although the notebooks may be stored locally on user computers such as terminal 522, they are shown here stored in a hosted system. Storing the notebooks 516a-516d in a hosted format may provide a number of advantages. For example, hosted documents can be made available to the public more easily. Hosted documents can also be updated in real time or near real time as information in the "source" web page changes. Hosted documents can be accessed by a user from a number of networked machines—such as machines at airports, cyber cafes and the like.

In addition, a hosting system such as notebook manager 520, which may be comprised of a combination of hardware (e.g., servers) and software for performing functions described in more detail below, may in appropriate circumstances perform more functions on a hosted set of notebooks than would be permitted if the notebooks were not stored centrally. For example, the manager 520 can search the content in the notebooks 516a-516d to return search results for other users, it can look at content in notebooks to make up indicators of popularity, and it can look at recent activity with respect to notebooks to obtain indicators of recent popularity.

A notebook manager 520 in a hosted system may also analyze connections in notebooks to improve general search results. For example, where a third-party user conducts a search for "Italian restaurants" or a similar concept, the search ranking or score of pages 514a, 514e, and 514f may be elevated relevant to other pages because they are referenced in a notebook captioned "Italian Restaurants." The elevation may occur under an assumption that the user who created notebook 516b was attempting to classify certain material, that the person selected an accurately descriptive heading or sub-heading, and that the page has thus been determined by a real person who is savvy enough to form a web notebook so as to be related to that term, and by extension to the search term.

In one implementation, each notebook may be stored as a separate mark up document, or each note may be stored as a separate mark up file, or other sort of file. Such options may be provided as alternatives or in combinations. One or more notebook indices may point to the notes or notebooks to permit organization and navigation of the notebooks. For example, an index may include a table containing a number of URLs associated with a particular user, so that when the user is accessing the system links to each of the notebooks may be shown. Likewise, users may search the index to find information on various other users. The index may be stored, for example, with other information relating to users and/or notebooks.

Notebook content may also be shared, if a notebook author chooses to do so. The sharing may be public so that any approved user of the system may see a notebook, or it may be less public, such as by providing access only to a group of approved users (e.g., friends or friends-of-friends) such as a social network or a group of users having special access privileges to a part of a system. In addition, the access may be structured so that other users can have read-only privileges, annotating or comment privileges, or full editorial privileges.

Particular global searches of the index may also be performed. For example, the system 500 may store information about which notebooks are most popular with other users, such as through a rating system or through a number of users accessing the notebooks. As a derivative measure, the system 500 may also track the popularity of certain notebook authors. The system 500 may then generate lists of popular notebooks or popular notebook authors for others to see. In addition, the lists may be limited to particular topics, such as most popular notebooks in a particular category (e.g., restaurant notebooks). Such lists and other analytical information about the notebooks may be shown on a web page that may be accessed by users attempting to browse the notebooks in notebooks database 518.

Notebook manager 520 shows an exemplary system (which may be a sub-system of a larger system) that can be used to create, manage, analyze, and deliver web notebooks. Components of notebook manager 520 allow it to store notebooks for various users in notebook database 518, to add content submitted by users to those notebooks, to search notebooks that match queries provided by users, to transmit requested notebooks for display to users, and other appropriate functions.

Notebook manager 520 communicates with the users, such as a user at terminal 522, through interface 526. Although not shown for clarity, a variety of communications components arranged in networks, such as a LAN, WAN, or the Internet, may be situated between terminal 522 and interface 526 in known manners. Interface 526 may be or include, for example, one or more web servers.

Notebook presenter 530 formats notebooks for display to users who have requested notebooks. Notebook presenter 530 may communicate with notebook database 518 to obtain notebook information where the notebook information is stored in a form other than as a complete notebook. Where notebooks are stored as multiple pieces or documents, notebook presenter 530 may access the parts that make up a notebook, and may combine and format them for presentation as a complete notebook to a user. For example, a notebook outline document may contain pointers to various notebook entries, and the notebook presenter 530 may read each pointer to determine which entries to add to the notebook so as to obtain all relevant note or entries stored in database 518. Notebook presenter 530 may then transmit the completed notebook to a user through interface 526.

Entries in a notebook or notebook outline document may also contain pointers to web pages outside of notebook database 518. Such pointers may be used, for example, when a notebook is intended to store information from web pages that change over time. Such information could include, in one example, the current temperatures in certain areas, such as in locations shown in a notebook dedicated to travel.

Because notebooks will generally use only a portion of the content in a web page, there may be challenges in locating the appropriate content when a web page has changed. For example, if a notebook author clips a paragraph from the middle of a page, and the page is later edited to substantially change the material on each side of the clipped paragraph (and even to change the paragraph itself), it may be difficult to locate the paragraph automatically among all the changes so as to permit updating of the paragraph in the notebook.

A number of techniques may be used to help ensure that the same content is accessed each time even as the values for the content change. For example, the position of the content in a web page may be determined (e.g., by determining the number of characters, words, or bytes into the page the content occurs, or by a position relative to another object such as a particular tag), as may tags that mark the beginning and end of the content. If the same tags appear at or near the same locations in the revised page as they were computed to occur in the original page, the system may determine that the proper content has been located in the revised page. In addition, tags on each side of the content may also be stored, and the location of the changed content may be checked against the location of the tags. Tags such as link tags may be particularly appropriate for such a determination, as they indicate an anchor point for the page to which the web page author presumably intended to focus attention.

If such determinations do not result in a sufficiently high level of confidence (which may be determined according to a scoring system that tallies all indicators that suggest the selection is proper) to permit system 500 to determine that the appropriate content in a page has been located, other determinations may be made. For example, system 500 may store certain metrics about a page when content is initially clipped—such as the total size of the page, the number of words in the page, the number and position of images in the page, and the number and type of other objects in the page. These metrics may be compared against the revised page to determine whether the page has changed so much that the notebooked content cannot be located with sufficient confidence.

If the content can be located, the system 500 may identify various candidates for the content (such as by comparing keywords in other content in the notebook, and comparing to keywords in the changed web page) and produce a score for each candidate by comparing the revised page with the particular candidate against whatever metrics the system has stored for the page. As a simplified example, if a notebook is titled "model race cars" and only one paragraph in the changed web page says anything about cars or models, that paragraph may be determined to be the relevant content (along with any heading that might exist for the paragraph).

The content included in the notebook may then be the candidate content with the highest score. If no such content is identified, viewers of the notebook may be provided with an appropriate message, such as a message asking the user to select the proper content from several candidates, or an error message.

Returning now to the components of notebook manager 520, notebook presenter 530 may use information stored in user information database 532 in preparing notebooks for transmission to users. For example, user information database 532 may store verification information about users. In such implementations, when a user requests access to a notebook, notebook presenter 530 may determine whether that user has access to the notebook, such as by checking access information stored in user information database 532.

User information database 532 can also store other information for the proper operation of notebook manager 520. For example, database 532 may include information for organizing notebooks, such as tables representing notebooks and pointers to documents that are entries or notes in the notebooks. Also, database 532 may store metadata about notebooks and notebook entries, including the author of a notebook, the time at which an entry was added to a notebook, the source of an entry, the size of an entry, and other pertinent information needed to manage notebooks and notebook entries.

Search engine 528 may be used by notebook presenter 530 to obtain information in response to queries from users. For example, search engine 528 may be in the form of a standard search engine such as a search engine that ranks documents according to their backlink relationships, and may search for information in notebooks 516a-516d. User queries may be in the form of search terms that may be applied to the corpus of content in database 518. For example, users may search for all notebooks containing content about Hawaiian vacations, and the search engine 528 may look for indicators of such content, such as the words "Hawaiian" and "vacation," related words such as "lei" and "leisure," and links to pages containing such terms. Likewise, users may search for information about patent attorneys, and may be provided in response a link to notebook 516d. If such a user selects the link, they may then be presented with the notebook. The content within the notebook 516d may include hyperlinks directed to web page 514g, so that if the user selects such a link, they may be provided with a display of the web page.

Search engine 528 may also be used for purposes other than searching of notebooks. For example, notebook manager 520 may submit queries, along with appropriate parameters (such as pointers to particular indices) to a standard search engine and may receive search results from the general search engine. In such a manner, an organization may leverage the operation of a general search engine to include searching relating to web notebooks.

Notebook formatter 524 may serve to receive requests from users to start new notebooks, and to add content to existing notebooks. Submission evaluator 524b within notebook formatter 524 receives information from interface 526, and may parse and analyze the information to determine the appropriate actions to take with respect to the information. For example, if the submission is sent, such as in the form of an HTTP request, with a command related to content selection, the submission evaluator may parse the submission to determine the command and to isolate the content submitted with the command. The content may be, for example, HTML code that has been selected by a user, and that content may be extracted from the other information submitted by terminal 522. In another example, the submission may include a request to edit a notebook, such as to add a heading in a notebook, or to edit content within a notebook, such as to add comments within content that previously has been clipped from a web page.

Notebook compiler 524a manages a user's notebooks, and adds, edits, or deletes content in notebooks. For example, where submission evaluator 524b has determined that a message (such as an HTTP request from the computer of a notebook author or other user) relates to content selected from a web page, it may pass the content to the notebook compiler 524a along with metadata that has been parsed from the request. The metadata may be used, for example, to determine the identity of the user, and to determine the user notebooks to which the content should be added. The notebook compiler 524a may then obtain the current version of the notebook from notebook database 518, and may append the new content to the notebook. The notebook compiler 524a may also update a database of metadata relating to the notebook (which may be stored, for example, in user information 532) and may save the updated notebook to database 518.

Notebook analyzer 534 may access notebooks in database 518 to provide users or administrators of the system 500 with information relating to the notebooks. Notebook analyzer 534 may be programmed with various processes and other features to obtain notebook information, analyze it, and generate reports regarding the information. For example, notebook analyzer 534 may be used by search engine 528 to build an index of content in database 518 to permit for more efficient searching of database 518. As another example, notebook analyzer 534 may identify links between notebooks and between notebooks and web pages, and may permit for mapping of relationships in the analyzed documents.

Through these components, notebook manager 520 may create new notebooks, edit existing notebooks, combine information from various notebooks, allow users to see notebooks created by other users, allow users to search across multiple notebooks, permit a system to analyze notebooks such as to provide searching of notebooks, more efficient searching of web content, and easier navigation of notebooks, and to permit reports to be generated regarding notebooks and notebook data. In certain implementations, fewer than all such functions may be performed by a notebook manager 520.

Figure 6:
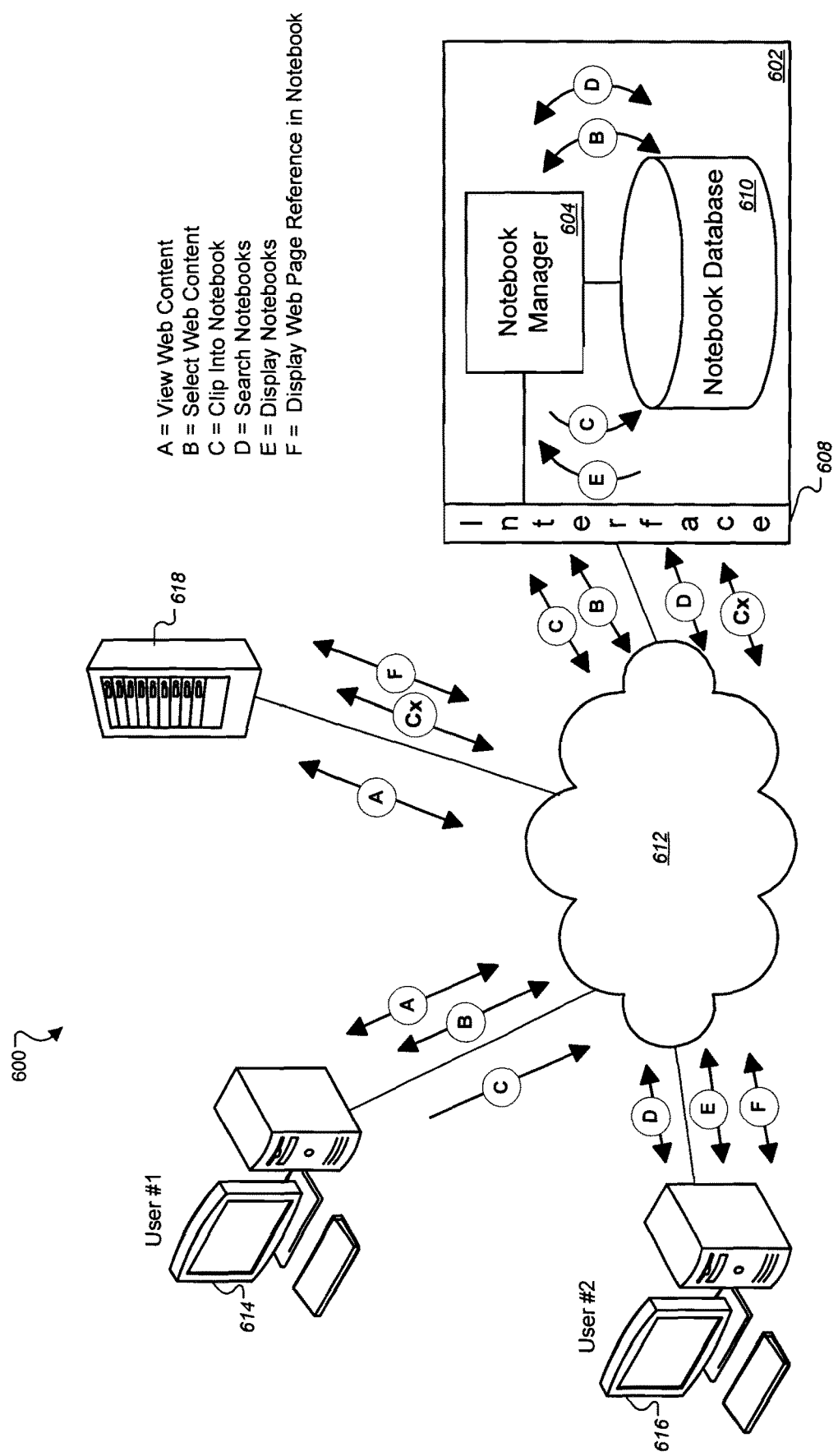
FIG. 6 is a schematic diagram showing an exemplary flow of information between components in a web notebook system.

FIG. 6 is a schematic diagram showing an exemplary flow of information between components in a web notebook system 600. The system 600 includes various computing devices or computing systems to communicate through a network 612 such as the Internet. Information service provider 602 stores information relating to notebooks in notebook database 610, which may be accessed by notebook manager 604. Notebook manager 604 may in certain implementations be the same as or similar to notebook manager 120 shown in FIG. 1. Notebook manager 604 communicates with other components in the system 600 through interface 608, which may be, for example, one or more web servers and other related components.

Rack server 618 represents a provider of web page content, such as a corporation presenting its web page, a commercial content provider, or other Web content provider. Various forms of content may be provided, though one common form of content is web pages using variants of mark up languages such as HTML.

Terminals for two users are also shown. Terminal 614 represents a computer that may be used by a person who creates a public web notebook by compiling information from various web pages. Terminal 616 represents a computer that may be used by a person looking for information about web notebooks.

Lettered arrows in the figure represent flows of information in an exemplary process for creating and reviewing notebook content. The process may begin with the arrows labeled A. Terminal 614 may be, at that time, used to browse the web. For example, a user of terminal 614 may be interested in New Zealand and the sights of New Zealand. That user may have just returned from a vacation in New Zealand and may wish to create a notebook summarizing what they saw while on vacation. At arrow A, the person obtains content from a web page stored on rack server 618, such as by entering a URL for a restaurant in Auckland. The rack server 618 may respond by providing a web page associated with the restaurant.

The arrows labeled B represent communications that occur when the user begins selecting information from the web page. For example, a user may highlight content from a web page by clicking and dragging across the content. This action may cause the beginning of a process to analyze the selected content, which may result in the system 600 providing the user with a name of a notebook from among the user's notebooks into which the content should be placed. For example, if the web page the user is reviewing has a heading of "New Zealand," and one of the user's notebooks has a similar heading, the notebook manager 604 may infer that the user intends to clip the information to the New Zealand notebook, and may present an icon representing that notebook as a default selection for the selected content. Alternatively, terminal 614 itself may make such an inference, or may simply place the selected content into whatever notebook is currently active on terminal 614. In such alternative situations, the communication shown by label B with the information service provider 602 would not be needed.

The arrows labeled C represent the addition of content to a notebook. For example, if a user chooses a notebook selected by notebook manager 604, the selected content may be saved to that notebook by notebook manager 604 in notebook database 610. Alternatively, selected content may be saved initially by an application operating on terminal 614, and may be transferred to notebook database 610 when such an action is chosen by a user, such as when a user chooses to save actions at the end of a browsing session. Alternatively, terminal 614 may send to the manager 604 information about a pointer to the content to be added, and manager 604 may obtain the information directly from rack server 618.

Where the content is on a web page that is regularly updated, the notebook manager may request the content later from rack server 618, such as shown by the arrows labeled Cx. In that situation, a link or pointer may initially be stored in the notebook, and the request for up-to-date content may be made by notebook manager 604 at an appropriate time, such as periodically or when a user requests to view the notebook.

The arrows labeled D represent a request for information by the user of terminal 616. The user may be interested in web notebook content or other web content, and may be conducting ordinary browsing and searching. The request may be, for example, a search request directed to notebooks in notebook database 610, or a more general search request covering content from the world wide web (WWW) and content in notebook database 610. The search request may take a normal form, whereby a user enters search terms and submits them by way of HTTP request to a search engine (not shown). The user in response may be provided a list of search results in the form of hyperlinks to matching content and additional information.

The arrows labeled E represent a selection by the user of terminal 616 of a web notebook from a search result. Such a selection, for example by selecting a hyperlink directed to the notebook, causes information service provider 602 to return an HTML document that represents the notebook. Terminal 616 then displays the document to the user. The notebook document may include content taken from various web pages by the user or by other users, and may also include hyperlinks to the web pages from which the content was taken.

The arrows labeled F represent selection by a user of terminal 616 of a hyperlink for content to a web notebook. As depicted, the hyperlink is directed to the original web page stored at rack server 618, which returns an HTML document to terminal 616 of that original web page. Alternatively, the web page could be cached at information service provider 602 and provided from there. The user may then navigate back to the notebook, select content from the web page or from the notebook to add to the user's own notebook, or perform other appropriate functions.

In this manner, the system 600 provides a user of terminal 614 the opportunity to create and publish Web notebooks that contain original content and also content derived from other web pages. The web notebooks may be published by system 600 as mark up (e.g., HTML) documents that contain the total of the mark up code that has been clipped from various sources in addition to content (e.g., headings and titles) added directly to the notebook. Alternatively, the notebooks may be built on-the-fly, in whole or in part, when a request is made for them, such as by storing a notebook as a number of pointers, and following the pointers to obtain content before serving the notebook in response to a request. The system 600 also enables users such as the user of terminal 616 to search for and review such Web notebooks, and thereby obtain information that is more relevant or more appropriately formatted than information scattered across multiple different web pages.

Figure 7:
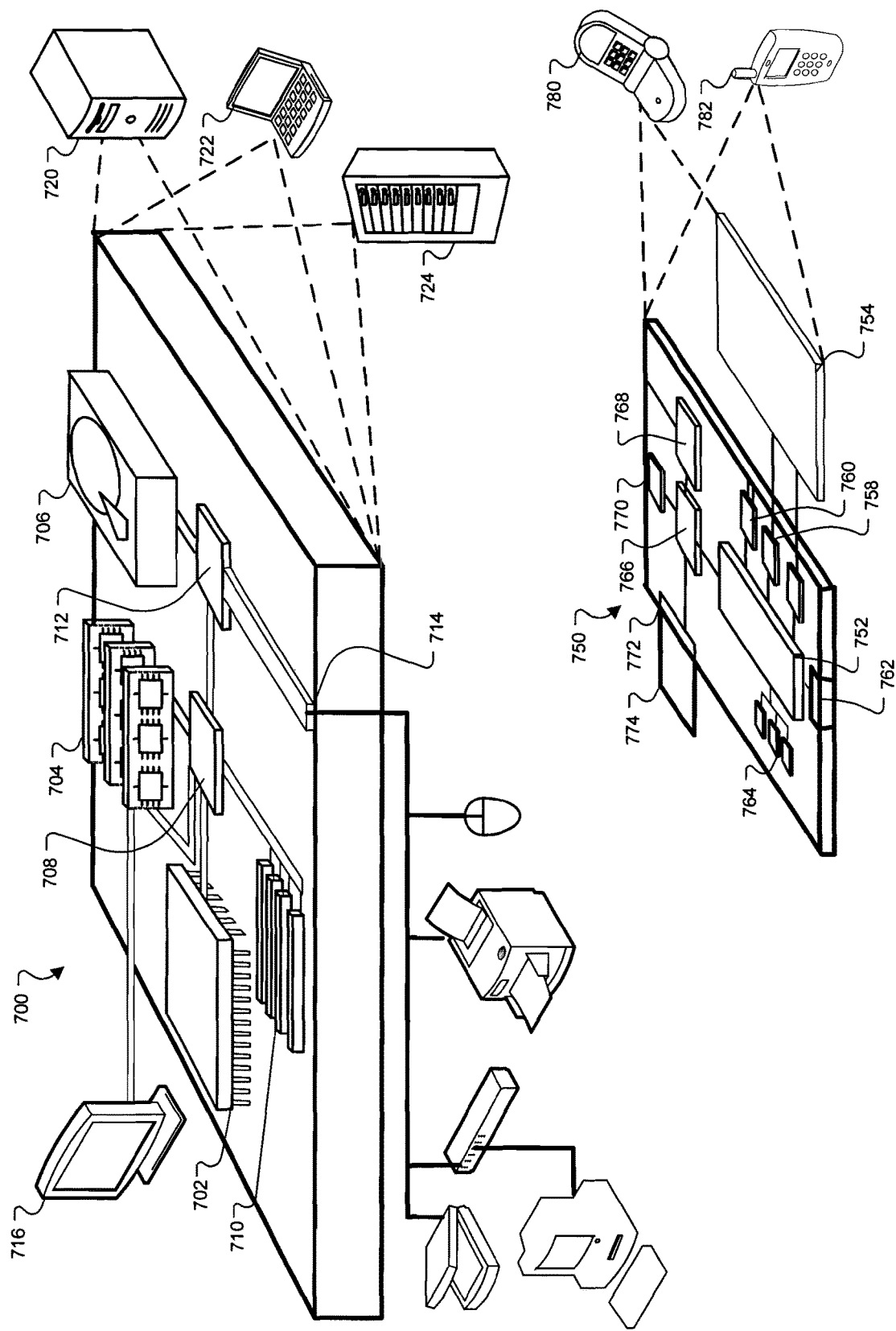
FIG. 7 is a block diagram of computing devices that may be used to implement the systems and methods described in this document, as either a client or as a server or plurality of servers.

FIG. 7 is a block diagram of computing devices 700 and 770 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 770 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosed implementations. Accordingly, other implementations are within the scope of the following claims.

What is claimed is:

1. A method implemented by one or more processors, the method comprising:
    identifying an entry, created based on user interface input provided by a given user via a given client device,
        wherein the entry is directed to a given web document, includes metadata about the given user, and includes user-supplied free-form text that is based on the user interface input,
        wherein the given web document is authored by an authoring user that is distinct from the given user, and
        wherein the given web document does not include one or more particular terms of the user-supplied free-form text;
    receiving, from an additional client device of an additional user that is in addition to the given user, a search query that is entered by the additional user at the additional client device, and that includes the one or more particular query terms;
    determining that the given web document is responsive to the search query based on determining that the one or more particular query terms, of the search query, are included in the user-supplied free-form text of the entry that is directed to the given web document; and
    in response to receiving the search query entered by the additional user and in response to determining, based on determining that the one or more particular query terms of the search query are included in the user-supplied free-form text of the entry created based on the user interface provided by the given user, that the given web document is responsive to the search query:
        providing, for presentation at the additional client device, a given search result that corresponds to the given web document.

2. The method of claim 1, further comprising:
    in response to receiving the search query and determining that the one or more particular query terms, of the search query, are included in the user-supplied free-form text of the entry that is directed to the given web document:
        providing, for presentation at the additional client device along with the given search result, a link to the entry.

3. The method of claim 1, wherein the given web document is a webpage.

4. The method of claim 1, further comprising:
    determining that an additional web document is responsive to the search query; and in response to the search query and in response to determining that the additional web document is responsive to the search query:
  providing, for presentation at the additional client device and along with the given search result, an additional search result that corresponds to the additional web document.

5. The method of claim 4, further comprising:
identifying a further entry, created based on further user interface input provided by a further user via a further client device,
  wherein the further entry is directed to the additional web document and includes further user-supplied free-form text that is based on the further user interface input, and
  wherein the additional web document does not include any terms of the further user-supplied free-form text; and
wherein determining that the additional web document is responsive to the search query is based on determining that the one or more particular query terms, of the search query, are included in the further user-supplied free-form text of the additional entry that is directed to the additional web document.

6. The method of claim 1, wherein the user-supplied free-form text is included in a title of the entry.

7. The method of claim 6, wherein the user-supplied free-form text is included in a heading of the entry.

8. A system, comprising:
a database, the database storing entries, the entries including an entry, created based on user interface input provided by a given user via a given client device,
  wherein the entry is directed to a given web document, includes metadata about the given user, and includes user-supplied free-form text that is based on the user interface input,
  wherein the given web document is authored by an authoring user that is distinct from the given user, and
  wherein the given web document does not include one or more particular terms of the user-supplied free-form text;
memory storing instructions;
one or more processors executing the instructions stored in the memory to:
  receive, from an additional client device of an additional user that is in addition to the given user, a search query that is entered by the additional user at the additional client device, and that includes the one or more particular query terms;
  determine that the given web document is responsive to the search query based on determining that the one or more particular query terms, of the search query, are included in the user-supplied free-form text of the entry that is directed to the given web document; and
  in response to receiving the search query entered by the additional user and in response to determining, based on determining that the one or more particular query terms of the search query are included in the user-supplied free-form text of the entry created based on the user interface provided by the given user, that the given web document is responsive to the search query:
    provide, for presentation at the additional client device, a given search result that corresponds to the given web document.

9. The system of claim 8, wherein one or more of the processors, in executing the instructions, are further to:
  in response to receiving the search query and determining that the one or more particular query terms, of the search query, are included in the user-supplied free-form text of the entry that is directed to the given web document:
    provide, for presentation at the additional client device along with the given search result, a link to the entry.

10. The system of claim 9, wherein the given web document is a webpage.

11. The system of claim 9, wherein one or more of the processors, in executing the instructions, are further to:
  determine that an additional web document is responsive to the search query; and
  in response to the search query and in response to determining that the additional web document is responsive to the search query:
    provide, for presentation at the additional client device and along with the given search result, an additional search result that corresponds to the additional web document.

12. The system of claim 11, wherein one or more of the processors, in executing the instructions, are further to:
  identify a further entry, created based on further user interface input provided by a further user via a further client device,
    wherein the further entry is directed to the additional web document and includes further user-supplied free-form text that is based on the further user interface input, and
    wherein the additional web document does not include any terms of the further user-supplied free-form text; and
  wherein in determining that the additional web document is responsive to the search query one or more of the processors are to determine that the additional web document is responsive to the search query based on determining that the one or more particular query terms, of the search query, are included in the further user-supplied free-form text of the additional entry that is directed to the additional web document.

13. The system of claim 8, wherein the user-supplied free-form text is included in a title of the entry.

14. The system of claim 8, wherein the user-supplied free-form text is included in a heading of the entry.

* * * * *